United States Patent Office 3,300,365
Patented Jan. 24, 1967

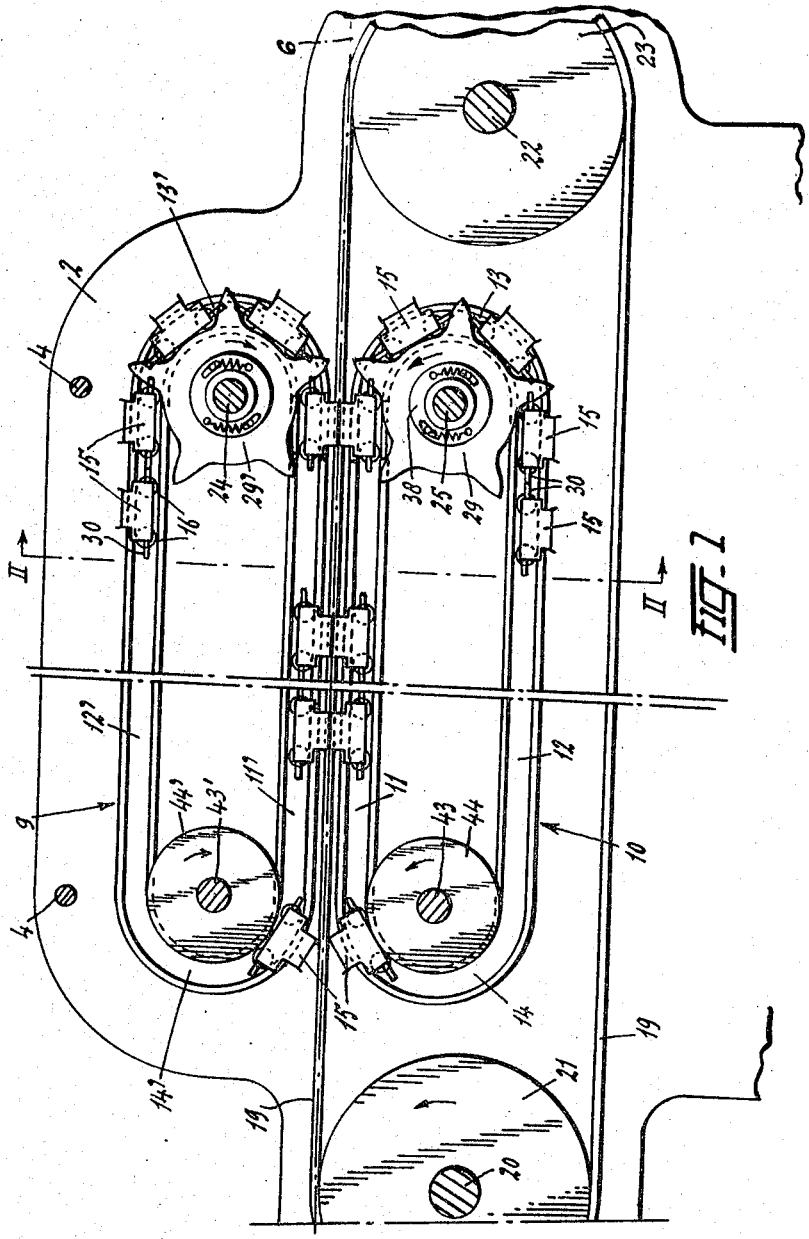

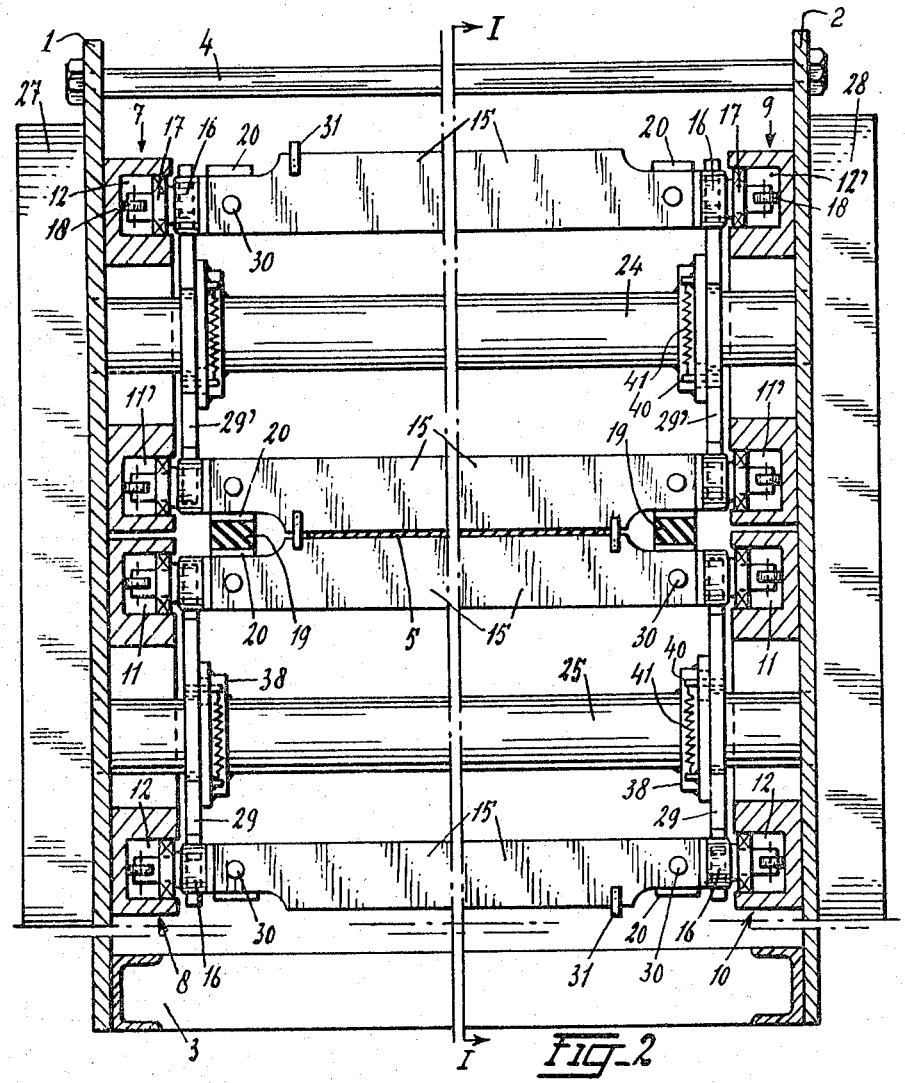

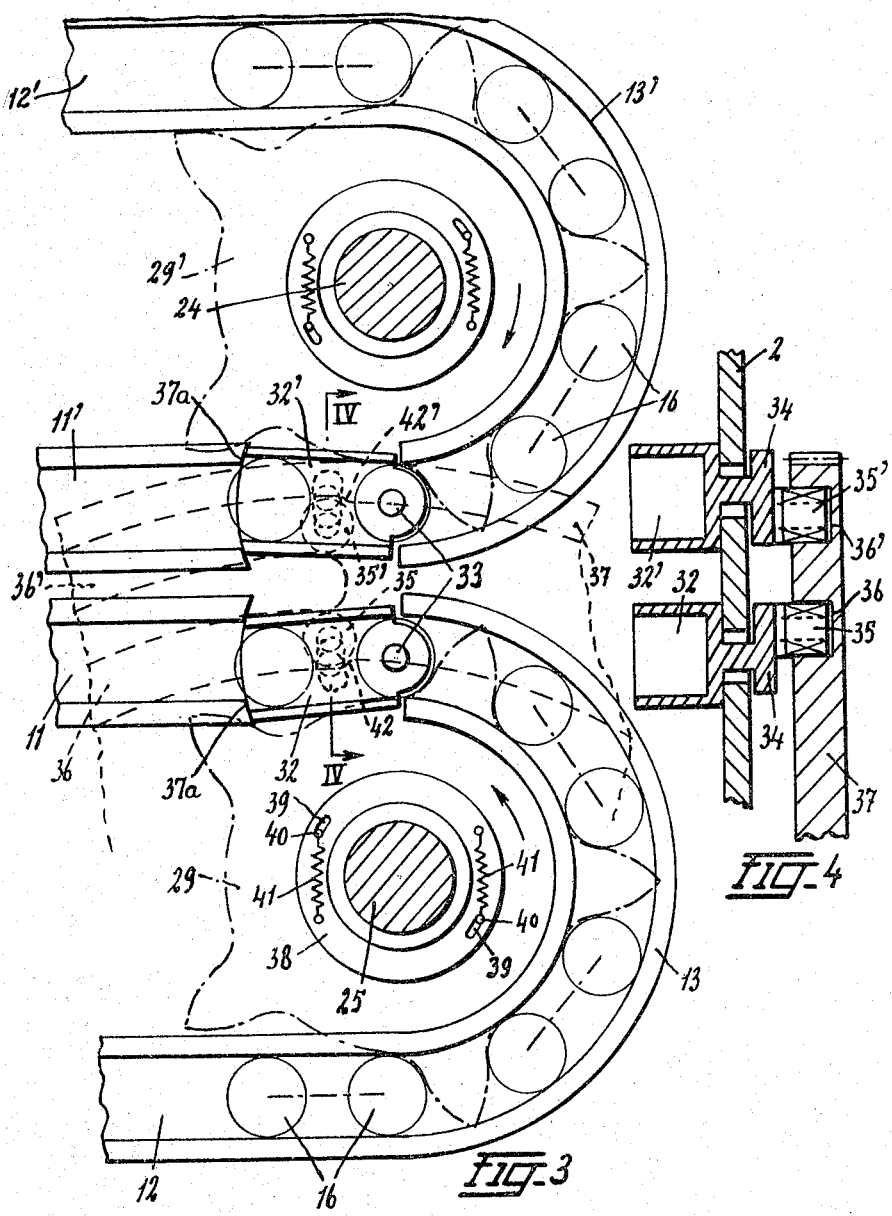

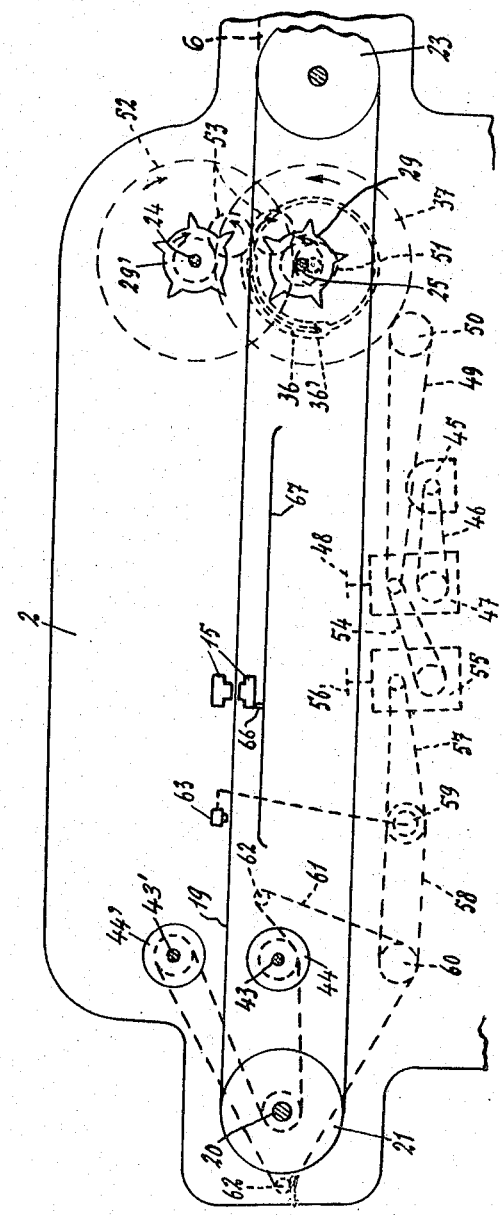

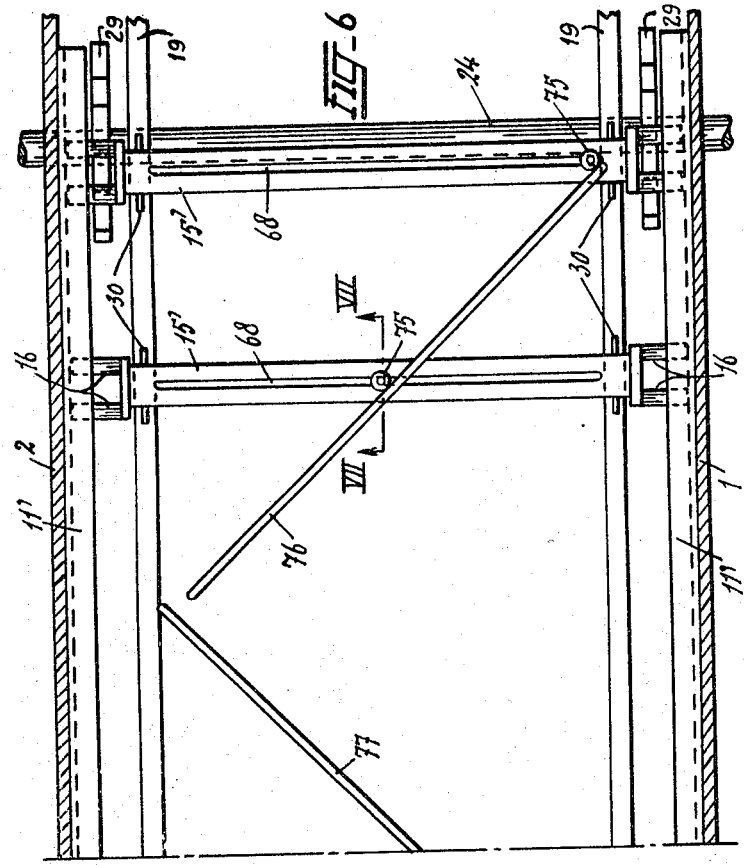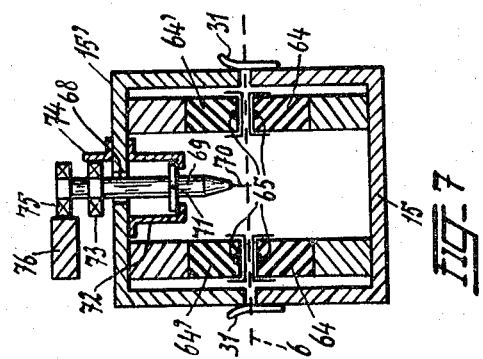

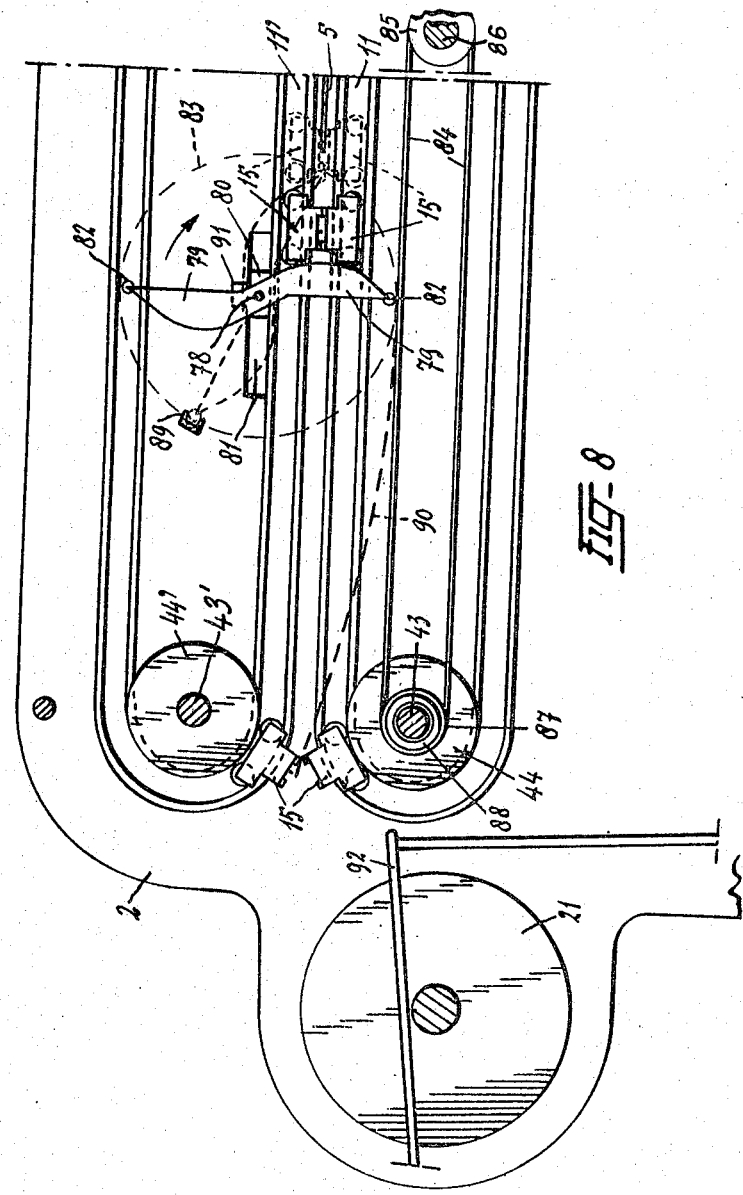

3,300,365
MACHINE FOR TREATING, SUCH AS HEAT SEALING AND CUTTING, A WEB OF SHEET MATERIAL, IN PARTICULAR FOR THE MANUFACTURE OF SACKS
Dirk Godfried Johannes Roos, Amsterdam, Netherlands, assignor to Trans-Atlas A.G., Basel, Switzerland
Filed Aug. 19, 1963, Ser. No. 303,070
Claims priority, application Netherlands, Aug. 23, 1962, 282,444
18 Claims. (Cl. 156—583)

The invention relates to a machine for treating, such as heat sealing and cutting, a web of sheet material, in particular a thermoplastic sheet material, in which the web is fed continuously through the machine.

More particularly the invention relates to a machine for the manufacture of sacks, in which a web of sheet material, which may for instance be taken from a supply roll in the form of a sack tube or of a strip of material that has been folded in the longitudinal direction, at regular distances as defined by the desired dimensions of the sacks to be made is sealed and cut through or perforated in order to form the desired sacks from the doubled layer of material.

It is an object of the invention to provide a machine of the kind referred to hereinbefore, in which the web of sheet material to be treated may be fed through the machine with a constant speed which may, however, be adjusted within wide limits and practically independently of the distances between the successive places of treatment of the web of material. It is another object of the invention to construct the said machine such that the said distances between the successive places of treatment of the material may exactly be regulated between wide limits even during the uninterrupted working of the machine. It should be noted in this respect that a constant speed of movement of the web of sheet material fed through the machine is especially important if before or behind the machine still other machines for the forming or treating of the web of material have been arranged. In case the machine is used for treating a web of thermoplastic material it will be possible for instance that before the machine according to the invention a machine for the manufacture of such a web of thermoplastic material is arranged, which continuously produces the web of sheet material by extrusion, while if desired behind the machine according to the invention the web of material or the sacks formed out of the same, whether still cohering or not, may be caused to travel through still other machines for further treatment.

Still another object of the invention is to provide a machine of the kind referred to hereinabove, which is not only suited to make sacks out of a tube or a foil of thin material, but which is also particularly suited for the manufacture of sacks out of comparatively thick and stiff thermoplastic material, for instance for the manufacture of sacks for packing cement, artificial manure and the like. Moreover it is an object of the invention to provide for a device of the kind referred to, which can easily be operated and adjusted by unskilled personnel.

With the above objects in view the machine according to the invention is characterized in that the same comprises a plurality of elongated carrier members, each having a web engaging surface and extending parallel to one another transversely of the path of travel of the web through the machine, said members being arranged in two groups, one on each side of said web travel path, at least some of said carrier members having web treating means arranged at said web engaging surface; two guide track means, each for guiding the carrier members of one of said groups for movement in a closed circuit, each track means comprising a leading track portion and a return track portion, the leading portions of said two track means extending parallel to each other on opposite sides of said web travel path and spaced at a distance from each other enabling two opposed carrier members of different groups when in opposed positions in said two leading track portions to clampingly engage a web to be treated between their opposed web engaging surfaces; carrier feed means arranged at the forward ends of said leading track portions for simultaneously feeding a carrier member of each group into the one and the other of said leading track portions; carrier return means arranged at the rear ends of said leading track portions for returning the carrier members through their associated return track portions to said carrier feed means; and a carrier driving means extending longitudinally adjacent said leading track portions and adapted to engage each pair of opposed cooperating carrier members fed into said leading track portions by said feed means so as to move said carrier members through said track portions from the forward end to the rear ends thereof.

By regulating the speed of the carrier feed mechanism the number of pairs of carrier members which with their web treating means pass through the machine per minute can be adjusted at will. On the other hand by regulating the speed of the carrier driving means, if once the feed speed is accurately adjusted, the mutual distance between the successive pairs of carrier members can be adjusted and thereby the length of the sacks to be manufactured, for example. Through a combination of both possibilities of regulation the speed of production can also be regulated. The web of sheet material itself, while moved on and treated by the carrier members, is allowed to travel through the machine in a straight path and need not be bent or curved, which latter measure might lead to disturbances when a comparatively thick and stiff material is treated.

For guiding their movement through the machine the carrier members may be caused to travel with slide members mounted at their ends along two closed guide tracks, each comprising two identical opposed guide rails, one arranged on each lateral side of the said web travel path, in which case it is to be preferred that the said slide members are adapted to prevent rotation of the carrier members with respect to the guide tracks.

The carrier driving means may consist of two endless belts or chains, one arranged on each lateral side of the web travel path, and having a surface layer of a resilient material, both being driven with equal speed in the same direction, while said carrier members each have two belt engaging portions on their web engaging side whereby two opposed cooperating carrier members fed into the said leading track portions clampingly engage said two belts between their respective belt engaging portions so as to be advanced by the said belts. In this way the belts or chains will each time move two carrier members clampingly engaging said belts or chains, while in their turn these carrier members clampingly engage the web of sheet material and move the same along with them.

The carrier members may include means for treating the web of sheet material, such as for instance sealing means, cutting means and the like, through which the web of sheet material can be sealed or severed in a transverse direction at the desired places. Preferably the carrier members are removably and exchangeably supported in the said guide tracks, so that the machine may quickly be adapted for different operations by exchanging the carrier members.

Still further objects and constructional particularities of the invention shall appear from the following description of an embodiment of the machine according to the invention with reference to the following drawings, wherein FIGURE 1 is a longitudinal section through a part of the machine taken along the invention, shown according to the line I—I of FIGURE 2.

FIGURE 2 is a vertical section taken along the line II—II of FIGURE 1.

FIGURE 3 shows a view of the feeding mechanism of the machine according to the invention on an enlarged scale.

FIGURE 4 shows a section through a detail of the said locking mechanism taken on the line IV—IV of FIGURE 3.

FIGURE 5 schematically shows the means by which the machine is driven.

FIGURE 6 is a horizontal section through a part of the machine taken above the upper leading track portion of the machine and shows a mechanism for the cutting of the web of sheet material.

FIGURE 7 is a vertical section through a pair of carrier members on an enlarged scale, taken along the line VII—VII of FIGURE 6, and FIGURE 8 shows a piling mechanism to be used with the machine according to the invention, shown in a vertical longitudinal section through the delivery end of the machine.

The machine according to the invention will now first be described with reference to the FIGURES 1 and 2 of the drawings.

The machine as shown in the drawings has a stand comprising two vertical parallel side plates 1 and 2, which are interconnected at their lower sides by a beam frame 3 and at their upper sides by a plurality of rods 4. The web 5 of sheet material to be treated (only shown in FIGURE 2), as for instance a sack tube of thermoplastic material, runs from a feed device (not shown), in which the sack tube may be manufactured for instance by extrusion, through the machine in a stretched path 6, which travel path 6 rises from the feed end of the machine towards the delivery end at a small angle of inclination.

Each of the said side plates 1, 2 is provided with two guide tracks, 7, 8 and 9, 10 respectively, arranged against the inner walls of the side plates and each consisting of U-shaped rails fastened to the said guide plates 1, 2. All of these guide tracks have an identical shape, and the guide tracks 7 and 9 are arranged, one exactly opposite to the other, above the web travel path 6 and the guide tracks 8 and 10 are arranged, likewise one exactly opposite to the other, below the web travel path 6. Each channel-shaped guide track has at its side directed towards the web travel path 6 a leading track portion 11, 11' respectively, extending parallel to the said web travel path, a return track portion 12, 12' respectively, likewise extending parallel to the said web travel path at some distance under the said leading track portion and above the same respectively, a semi-circular entrance bend portion 13, 13' respectively, interconnecting the said parallel track portions, and a semi-circular outlet bend portion 14, 14' respectively, likewise interconnecting these two track portions. Each pair of opposite guiding tracks 7 and 9, and 8 and 10 respectively, serves for guiding a plurality of carrier members 15 (of which only a few are shown in FIGURE 1), which carrier members extend parallel to the plane of the web travel path 6 and perpendicular to the direction of movement of the web of sheet material. The carrier members 15 are provided at each of their ends with two shaft journal members 16 supporting travelling rollers 17, running in the guide track channels. Moreover, at the ends of the said journal members additional pressing rollers 18 have been arranged with their axes perpendicular to the axes of the said first rollers 17, which pressing rollers engage the bottom of the guide track channels. As a result of the way in which, by means of the rollers 17 and 18, the carrier members are supported in the opposite guide track channels, these carrier members, when moved through the guide tracks, are maintained in the correct transverse and longitudinal position, while they are at the same time prevented from rotating in the guide tracks about their longitudinal axes.

The carrier members 15 are divided into two equal groups, the carrier members of the one group travelling in the upper guide track circuit and the carrier members of the other group travelling in the lower guide track circuit. The leading portions 11 and 11' of the guide tracks situated on either lateral side of the web path 6 are arranged at such a short distance one from the other that, in a manner as will be described more fully hereinafter, two opposed carrier members 15 moving through these guide track portions are able to clampingly engage the web 5 between the opposed surfaces of their middle parts and thereby carry the web along with them. Moreover, certain members for treating, such as heat sealing and cutting, the web 5 of sheet material (such members likewise still further to be described hereinafter) are also arranged in the carrier members 15.

In order to move the carrier members 15 through the said leading guide track portions 11, 11', two endless rubber belts 19 are used, which at the one end of the machine are led over two driving pulleys 21 fastened on a driven shaft 20 and at the other end of the machine over two guide pulleys 23, which are freely rotatably arranged on a spindle 22 (see FIGURE 1). The belts 19 travel between the side plates 1 and 2 and have upper reaches extending in the plane of the web travel path 6 at the left and at the right lateral side of the same respectively. The carrier members 15 are provided near either of their ends with a recessed portion in which a clamp plate 20 is fixed to the carrier member in such way that two opposed clamp plates 20 of two cooperating carrier members 15, travelling through the leading guide track portions 11 and 11', are situated at such a distance one from the other that they clampingly engage the rubber belt 19 lying between the same. Consequently the carrier members are hereby moved along through the leading guide track portions by the driven belts 19. It is likewise possible in place of rubber belts to use roller chains provided with rubber blocks mounted between the links, in which case the pulleys 21 and 23 must be formed as chain wheels.

The carrier members of each of the two carrier member groups are fed into the leading guide track portions 11, 11' in pairs by means of a feeding mechanism (see also FIGURES 3 and 4). This feeding mechanism comprises two coupled continuously driven shafts 24 and 25, rotating in opposite directions according to the arrows shown in FIGURE 1, but with the same speed. These shafts 24 and 25 are supported in the side plates 1 and 2 in such way that their axes substantially pass through the centers of curvature of the semi-circular entrance bend portions 13 and 13' of the guide tracks. The shafts are coupled one with the other, in a manner as will still further be described hereinafter, by means of toothed wheels, which are mounted in gearing boxes 27, 28 at the outer sides of the side plates 1 and 2. Each of the said shafts supports two toothed wheels 29, 29', the teeth of which cover the entrance bend portions 13 and 13' of the guide tracks and are shaped in such way that two successive teeth are adapted to engage between them with a slight play the two journal members at the end of each carrier member 15. Thus the toothed wheels 29, 29' may seize one by one the carrier members supplied through the return track portions 12 and 12', and move them gradually through the bend portions 13 and 13', upward or downward respectively, towards the leading guide track portions 11 and 11'. In connection herewith the carrier members are provided with buffer pins 30, by which they rest against each other at the end of the downward-slanting return track portions 12 and 12' and are held apart at a sufficient distance from each other to insure that the teeth of the toothed wheels 29, 29' will always extend between two carrier members. As a matter of course the toothed wheels 29 mounted on the lower shaft 25 are placed in such position with respect to the toothed wheels 29' mounted on the upper shaft 24, that they will always bring two carrier members 15 simultaneously and exactly opposite each other into the leading guide track portions 11, 11'. As an additional guarantee for the correct relative position of two thus cooperating carrier members 15, these carrier members are provided, in the way as shown in the drawings, with tongues 31, which are fastened against the side walls of the said carrier members and center the same with respect to each other.

For correct operation of the machine it is very important that a pair of carrier members always be brought quickly into engagement with the conveyor belts 19 as well as with the web 5 of sheet material to be treated and at the right moment in order to insure, that the pairs of carrier members traveling in the leading track portions will always lie exactly at the same distances from each other so that the sacks to be formed from the web of sheet material by means of the said carrier members will always have identical dimensions. With this intention, there is provided between the end of each bend portion, 13 and 13' respectively, of the guide track and the forward end of each of the leading track portions 11, 11' respectively a short guide track portion 32 and 32' respectively, which at its rear end opposite from said forward end of the relative leading track portion is mounted so as to allow a swinging movement about the axis 33 (see FIGURES 3 and 4). Each of said short guide track portions 32, 32' is provided with an arm 34, which with some play passes through an opening in the side plate 1, 2 and which supports a roller 35, 35' respectively. The rollers 35 and 35' of two guide track portions 32, 32' situated one above the other on the same side of the machine are allowed to travel in two closed guide channels or slots 36, 36', which are arranged in one face of a large toothed control wheel 37. These two toothed wheels 37 situated at either side of the machine are coupled with the shafts 24 and 25 through such a toothed gearing that for each movement of the toothed wheels 29, 29' over a single pitch the toothed wheels 37 will make a complete turn. The guide channels 36 and 36' provided in the toothed wheels 37 are so formed that over a part of their length they will hold the hingedly mounted short guide track portions 32 and 32' in the locking position as shown in FIGURE 3, in which these track portions are swung away so that they are not in line with the leading guide track portions 11 and 11'. As a consequence a carrier member 15, which is fed with its shaft journal members 16 (schematically shown in FIGURE 3) into two opposite guide track portions 32, will by the foremost of its travelling rollers stop against the lower or the upper edge 37a at the commencement of the guide track portions 11 or 11' respectively so that the carrier member is prevented from being further moved. The toothed wheels 29, 29' are each coupled with the respective shaft 24, 25 through a spring coupling, which allows a limited relative angular rotation of the toothed wheels 29, 29' with respect to the shafts. This spring coupling comprises a boss 38 fixed on the associated shaft and provided with two slots 39, and two pins or cams 40 passing through said slots, said pins being arranged on the respective toothed wheels 29, 29', which toothed wheels are rotatably mounted on the shaft. Two tension springs 41 are fixed at one of their ends to one of the pins 40 and at their other ends they are attached on the boss 38 so that they tend to maintain the toothed wheel in a position in which the pins engage the relative end walls of the slots 39. Whenever a carrier member by its shaft journal members 16 stops against the stop edges 37a of the guide track portions 11, 11' respectively, the two toothed wheels 29 and 29' respectively which drive the carrier member are prevented from rotating any further so that the shaft 25, 24 respectively which continues turning will stretch the springs 41. After the springs have been stretched, as a result of a discontinuity 42, 42' respectively of the guide channels 36, 36' respectively, the rollers 35, 35' respectively, are now suddenly moved towards each other so that the guide track portions, 32' 32' respectively, are suddenly brought into line with the guide track portions 11, 11' respectively. This happens to both guide track portions 32 and 32' exactly simultaneously, so that the carrier members located in the same are suddenly swung towards each other and as a result of the action of the releasing springs 41 the carrier members are accelerated in a forward direction, whereby these carrier members will vigorously engage to the rubber conveyor belts 19 and at the same time clampingly fix the web 5 of sheet material between them, which parts up to that moment could freely move along between the two carrier members.

At the rear end of the leading guide track portions 11, 11' a carrier return mechanism has been arranged for leading the carrier members through the bend portions 14 and 14' into the return track portions 12, 12', through which the carrier members will then by gravity roll down along these slanting track portions towards the carrier feed mechanism. The said return mechanism also consists of two coupled driven shafts 43 and 43', which are rotatably mounted in the side plates 1 and 2 and which also with their axes substantially pass through the centers of curvature of the respective outlet bend portions 14, 14'. Each of said shafts 43, 43' supports two wheels 44 and 44' respectively fixed on said shafts, covered with rubber (see FIGURE 1), and having such a radius, that the carirer members 15 when reaching the bend track portions 14, 14' will with their back surfaces directed towards the said wheels abut against the same and will then under slight pressure be clamped in between the wheels and the opposite guide track portions so that they are moved along by said wheels which rotate in the mutually opposite direction as indicated by arrows in FIGURE 1. The shafts 43, 43' are coupled with the driving shaft 20 of the conveyor belts via a transmission which provides that the circumferential speed of said wheels is substantially equal to the linear speed of the belts 19.

The way in which the machine is driven and controlled as well as the means applied for that purpose are schematically shown in FIGURE 5.

An electromotor 45 drives by means of a chain 46 a wheel mounted on the driving shaft of a gearing 47, in which the gear ratio can continuously be regulated by means of a handwheel 48. The driven end shaft of the gearing 47 drives on the one side via a chain 49 a toothed wheel 50, which is in mesh with the large toothed wheel 37 comprising the guide channels 36 and 36'. By means of a small toothed wheel 51 mounted on the shaft of the toothed wheel 37 and a large toothed wheel 52 mounted on the shaft 24 the two toothed wheels 29' mounted on the shaft 24 are driven in the desired ratio of 5 to 1, while at the same time, by the shaft 24 through a tooth wheel train 53, the shaft 25 is driven with the toothed wheels 29 thereon rotating at the same speed. On the other side of the machine a similar gearing is arranged between the toothed wheel 37 which controls the swinging guide track portions 42, 42', and the shafts 24 and 25 of the toothed wheels 29, 29'.

The driven end shaft of the regulable gearing mechanism 47 drives on its other side via a chain 54 the driving shaft of a second gearing mechanism 55 which has a gear ratio that may continuously be regulated by means of a handwheel 56. The driven end shaft of the gearing mechanism 55 drives via chains 57 and 58 and an intermediate regulable differential 59 the shaft of a chain wheel 60. A chain 61 driven by said chain wheel 60 is led over chain wheels arranged on the shafts 43, 43' of the carrier return wheels 44 and 44' and on the shaft 20 of the driving pulley 21 for the conveyor belts 19 as well as over guide wheels 62.

It follows from the foregoing that by adjusting the hand wheel 56, the speed of the driving belts 19 and the carrier return wheels 44, 44' with respect to the carrier feed wheels 29, 29' can continuously be regulated, so that in this way the distance between the successive pairs of carrier members advanced by the driving belts 19 and thereby the dimensions of the sacks in the direction of length of the web 5 of sheet material can accurately be adjusted within large limits. On the other hand by adjusting the hand wheel 48 the speed of production of the machine can continuously be regulated while the ratio between the speed of the driving belts 19 and the speed of rotation of the feed wheels 29, 29' remains constant.

If a pre-printed web of sheet material must be treated it is very important that all treatments such as sealing and cutting are each time performed at identical places with respect to the printed indicia. However, in many cases the mutual distances between the indicia have slight deviations, which may be caused, for example, by shifting in the printing machine or by a stretch of the material to be treated and the like. A cumulation of these slight deviations could result in that finally the places of treatment of the material might pass in the middle of the printed indicia, which of course would be very undesirable. As has been indicated schematically in FIGURE 5 it is now possible, however, to arrange above the web of sheet material a photoelectric cell 63, which is activated by printed indicia on the web of sheet material at regular distances. This photoelectric cell 63 controls in a manner which is known per se via an amplifier the differential 59 in such way that the driving belts 19 will slightly be accelerated or retarded respectively as the printed indicia pass the photoelectric cell too late or too early.

The means for treating the sheet of web material which are taken up in the carrier members may have several different constructions. A preferred embodiment of said means is schematically shown in FIGURES 6 and 7.

Each of the carrier members is shaped in the form of a U-profile, said U-profiles being situated with their open sides towards one other when the carrier members are in their working position in the leading portions of the track. In each of the carrier members two pressure blocks 64 and 64' respectively of silicone rubber or any other suitable somewhat resilient material have been arranged, which blocks extend in the longitudinal direction of the carrier member.

The pressure blocks 64 of the lower carrier member are situated opposite the pressure blocks 64' of the upper carrier member, at such a distance that a web of material (which for the sake of clearness has not been shown in FIGURE 7) may be clamped between the said blocks when the carrier members are moved through the leading guide track portions 11, 11'. Over the total length of the pressure surfaces of the blocks 64, 64' filaments 65, screened by an insulating material, have been inserted, through which, during the movement of the carrier members through the guide track portions 11, 11', an electric current is conducted. So thereby the web of sheet material, as for instance a sack tube of thermoplastic material, is heated at two places both at its lower side and at its upper side, whereby at a short distance from each other two parallel welding joints may be made in the sack tube. If the sheet material of the sack tube is of small thickness it may also be sufficient to insert the electric filaments only in the pressure blocks of the lower or of the upper carrier member, while if only one welding joint should be desired only one or both of the left pressure blocks or the right blocks respectively may be provided with a filament. In this case it is likewise possible to construct the machine in such way that each carrier member has only one single pressure block.

The supply of current to the filaments 65 may be effected in several different ways. As has been indicated schematically in FIGURE 5 with respect to the lower carrier member of a pair of carrier members, this carrier member may be provided with a contact brush 66 which is connected with one of the ends of the associated filament and which engages a contact rail 67 extending along the forward path of the carrier member, said contact rail being connected with one of the poles of a source of current, the other pole of which is connected with the other end of the filament, or the filaments respectively, via the frame of the machine. The contact rail 67 may have an adjustable length, so that in dependence on the period of sealing required for the particular material to be treated and on the speed of movement of the web of material through the machine, the period during which a current is caused to flow through the filaments may be regulated.

In FIGURES 6 and 7, a preferred embodiment of a cutting device for cutting the web of sheet material between the joints has also been represented. In each pair of carrier members the upper carrier members 15' have been provided with a longitudinal slot 68 through which a pin 69 passes inwardly, the lower end of said pin supporting a knife 70 the edge of which is directed transversely of the travel path of the web of material. At the lower side the pin 69 is supported and guided between two guide strips 72 by means of a flange 71 fixed to the said lower end of the pin, while at its upper end the pin travels along a guide strip 74 by a roller 73 provided on the pin. Finally the upper end of the pin 69 supports a roller 75. Above the travel path of the carrier members 15' and between the frame plates 1 and 2 a guide rod 76 is arranged in the path of the roller 75 and forms an oblique angle with respect to the direction of movement of the carrier member. A second guide rod 77, also extending in oblique direction but substantially perpendicular to the direction in which the said first mentioned rod extends follows the said first mentioned guide rod 76.

At the beginning of the movement of the carrier member 15' through the guide track portion 11' the pin 69 is situated at the one end of the slot 68 and, when the carrier member is advanced, the pin abuts with its roller 75 the guide rod 76, whereby the pin 69 will be displaced in a transverse direction towards the other end of the slot 68. During this movement the knife 70 cuts through the web of material clamped between the two carrier members 15 and 15'. The said second guide rod 77 serves for returning the pin 69 in a similar way to its starting position.

After what has been set forth hereinbefore the working of the described machine will need no further elucidation. Since the web 5 of sheet material is advanced through the machine at an equal speed by pairs of carrier members which clampingly engage the said web at regular distances, while during the movement of the carrier members through the machine these carrier members will also perform any necessary treatment of the web of sheet material, it will be possible to treat even comparatively stiff materials and to attain a large speed of production under maintenance of a great accuracy as to the desired distance between the successive places of treatment. Moreover, this distance can easily and continuously be regulated. If anywhere in the return guide track portions the upper flanges of the U-shaped guide rails are provided with an opening, it will be easy to remove the carrier members from the guide tracks and to substitute other carrier members, whenever this might be necessary, as for example, for performing treatments of any other kind.

In many known machines for the manufacture of sacks the piling up of the manufactured sacks in flat regular piles still forms a great problem, in particular where the sacks are made of a soft material, while moreover the static electricity which may be generated often leads to certain difficulties.

On the contrary, however, in the described machine according to the invention, in which the manufactured sacks are supplied at a regular speed and in stretched position, it is easily possible on piling the sacks to join the same in regular piles. The piling mechanism to be used in cooperation with the present machine has somewhat schematically been shown in FIGURE 8.

The said piling mechanism comprises a rotatably supported shaft 78, on which two substantially triangular wings 79 are mounted, said wings laying diametrically opposite one another. The ends of the shaft 78 are supported by slide bearings 80, that are adapted to be displaced and to be fixed respectively in slots 81, said slots being arranged in the side plates 1 and 2, one opposite the other and parallel to the travel path of the web 5 of sheet material. The triangular wings 79 are situated about midway between the side plates 1 and 2. It is also possible to arrange a plurality of such pairs of wings on the shaft 78 beside each other. Each of the said wings 79 supports at its outer end a rubber roller 82. When the wings are rotated the said rollers will describe a circular path 83, which touches the upper surface of an endless belt 84 arranged under the leading guide track portions 11, 11' and parallel to the same. At one end of the machine the belt 84 runs over a guide roll 85 which is freely rotatable on a shaft 86, arranged between the side plates 1 and 2. At the other end of the machine, comprising the carrier member return mechanism, the belt 84 runs over a roller 87, mounted on the driven shaft 43 of the said return mechanism in such way that the roller can freely rotate about said shaft, but can also be coupled with the same by means of an electromagnetic clutch coupling 88.

The wings 79 have a position of rest as indicated in dotted lines in which position one wing extends forward and is kept in place by supporting the roller 82 slightly pinched between two nocks 89 mounted on a cross-bar. In this position the forward extending wing lies above the travel path of the pairs of carrier members 15, while the backward extending wing lies with its roller 82 just above the travel path of the web 5 of sheet material.

It is assumed that a pair of carrier members 15, for instance of the type as shown in FIGURE 6, is moved through the guide track portions 11 and 11' towards the piling mechanism while this pair of carrier members still clampingly engages the web of sheet material between the two pairs of pressure blocks arranged in said carrier members but has already cut through the said web of sheet material between the said pressure blocks. As soon as such pair of carrier members reaches the position as indicated in FIGURE 8 by dotted lines the same abuts against the roller 82 of the backward extending wing 79 and swings the same downward in the direction of the arrow shown in FIGURE 8. The roller 82 then pushes against the web of sheet material extending outwardly from the carrier members and pulls this web loose from the clamping engagement of the carrier members, so that this end of the web of material or of the sack will fall down. During their continued movement the carrier members 15 will swing the wing further downwardly till the same takes the vertical position as shown in FIGURE 8 in solid lines, in which position the roller 82 of the said wing presses the loosened sack end against the conveyor band 84. The shaft 78 is adjusted at such a distance from the rear end of the guide track portions 11, 11', that just at the moment, in which the loosened rear end of the sack is pressed against the band 84, the carrier members, which up till then were clampingly engaging the forward end of the related sack 90, are moved away one from the other thus loosening the said forward end of the sack, which then also falls down on the conveyor band 84. Thereafter the downward extending wing 79 is swung upward again by the carrier members 15 until, after a rotation over 180 degrees, the wings will have reached again the position of rest as indicated in the figure in dotted lines, in which position, the other wing 79 which extends backward is adapted to cooperate with the next pair of carrier members. A counting mechanism 91, mounted on the slide bearing 80, is coupled with the shaft 78, said counting mechanism being adjusted in such way that, after a regulable number of half revolutions of the shaft 78 bearing the said wings, a current impulse is given, by which the electromagnetic coupling 88 will be excited for a short time so that the roller 87 is coupled with the driven shaft of the carrier return wheel. Thereby the conveyor belt will be driven, thus transporting the pile of sacks formed on the same towards a slanting piling table 92. Thereafter the conveyor belt 84 will come to a stop again before the next sack is laid down on the same.

What I claim is:

1. A machine for operating on a web of sheet material, which is fed with continuous movement along a path through the machine, said machine comprising a plurality of carrier members, each having a web engaging surface and extending parallel to one another transversely of the path of travel of the web through the machine, said members being arranged in two groups, one on each side of said path of travel of the web, at least some of said carrier members including means for operating on said web arranged at said web engaging surface; two guide track means, each for guiding the carrier members of one of said groups for movement in a closed path, each track means comprising a leading track portion and a return track portion each having forward and rear ends, the leading portions of said two track means extending parallel to each other on opposite sides of said path of travel of said web and spaced at a distance from each other for enabling two opposed carrier members of different groups when in opposed positions in said two leading track portions to clampingly engage the web between opposed web engaging surfaces; carrier feed means at the forward ends of said leading track portions for simultaneously feeding a carrier member of each group into the respective track portions; carrier return means at the rear ends of said leading track portions for returning the carrier members through their associated return track portions to said carrier feed means; and carrier driving means extending longitudinally adjacent said leading track portions for engaging each pair of opposed cooperating carrier members fed into said leading track portions by said feed means to move said carrier members through said track portions from the forward end to the rear ends thereof.

2. A machine as claimed in claim 1 wherein each of said two guide track means comprises two identical opposed guide rails, one arranged on each lateral side of said web travel path, said carrier members having ends and including means mounted at said ends accommodated by said guide rails for movement therealong.

3. A machine as claimed in claim 2 wherein said guide rails are of channel shape and include flanges and a bottom portion, said means at the ends of the carrier members including at each end two rollers arranged adjacent one another between the flanges for rotation about parallel axes and a third roller supported for rotation about an axis perpendicular to the axes of said first two rollers and in contact with the bottom portion of the associated guide roll.

4. A machine as claimed in claim 2 wherein said carrier driving means comprises two endless belts each arranged on a respective lateral side of the web travel path, and drive means for advancing said belts at equal speeds in the same direction, said carrier members each including two belt engaging portions on their web engaging side whereby two opposed cooperating carrier members which are fed into said leading track portions clampingly engage said two belts between their respective belt engaging portions so as to be advanced by said belts.

5. A machine as claimed in claim 2 wherein each guide rail includes a semi-circular portion joining the return portion of the guide track rail with the forward end of the corresponding leading rail portion, said carrier feed means comprising a number of rotatably mounted toothed feed wheels driven in synchronous rotation and each arranged adjacent one of said semi-circular portions for rotation about axes passing substantially through the respective centers of curvature of said semi-circular portions, said wheels having teeth formed and spaced such that each wheel can engage, between successive teeth thereof, the end portions of successive carrier members, whereby said wheels move said carrier members through said guide track semi-circular portions.

6. A machine as claimed in claim 5 comprising two shafts supporting the toothed feed wheels, one shaft carrying two wheels for each guide track, said shafts being driven at the same speed in opposite directions, a coupling including spring means mounting each wheel on its associated shaft and allowing limited rotation of said wheel relative to said shaft against the action of the spring means of said coupling, movable stop means at the forward end of the leading track portion of each rail for temporarily stopping the carrier members as the same are about to enter the leading track portion, means controlling said stop means from said shafts such that two opposed carrier members which are simultaneously fed towards said two leading track portions are first momentarily held by said stop means, during which time the toothed feed wheels likewise remain stationary and said spring means are deformed, after which said stop means are moved to suddenly and simultaneously release said two opposed carrier members under the action of the spring means.

7. A machine as claimed in claim 6 wherein said stop means comprises a short guide rail segment at the forward end of the associated leading roll portion, means pivotally mounting the guide rail segment at an end thereof for movement between a release position in alignment with said leading rail portion and a locking position in which a roller of a carrier member located in said rail segments abuts the leading rail portion and cannot pass thereinto.

8. A machine as claimed in claim 7 comprising means operatively engaging the rail segments to control movement of each of said rail segments, the latter means including a roller laterally extending from said segment, a control wheel having a pair of guide slots in which are accommodated the last mentioned rollers of two opposed rail segments on the same lateral side, said control wheel being mounted for rotation about an axis parallel to the axes of rotation of said toothed feed wheels and drive means coupling the latter wheels with the control wheel in driving relation.

9. A machine as claimed in claim 2 wherein each guide rail includes a substantially semi-circular portion connecting the rear end of the leading track portions of each guide track to the return track portion thereof, said carrier return means comprising a plurality of rotatably mounted wheels driven for synchronous rotation about axes passing substantially through the respective centers of curvature of said semi-circular portions, said wheels having a resilient surface and a sufficient diameter to cause the carrier members upon reaching the rear end of the leading track portions to be resiliently engaged by the surfaces of said and advanced by said wheels through said semi-circular portions of each guide track.

10. A machine as claimed in claim 2 wherein the said return track portions of the said guide tracks extend slantingly downward from the carrier return means to the carrier feed means to enable the carrier members to move by gravity from the carrier return means to the carrier feed means.

11. A machine as claimed in claim 2 comprising cutting means on each of the said carrier members of one group, said carrier members being provided with a slot extending transversely with respect to the direction of advancement of the web, said cutting means including a cutting member guidably and movably supported in each of the slots for transversely cutting through the web of sheet material fed between opposed carrier members, two fixedly attached guide rods extending in a plane parallel to the plane of the path of travel of the web, the first of said rods transversely passing over the path of the web in an oblique direction with respect to the direction of movement of said web, the second rod being arranged behind the said first rod and passing over the path of travel of the web in an opposite oblique direction, said rods being located to contact the carrier members as the same travel through the leading track portions of the said guide track such that the first of said rods urges the cutting member to travel transversely in the said longitudinal slot and thereafter the said second rod urges the cutting member to travel back again through the said slot to the original position thereof.

12. A machine as claimed in claim 2 comprising means on each of the carrier members of at least one of the groups of carrier members for welding together two thicknesses of material comprising heating elements for heat sealing the web of sheet material, and a current rail extending along the said leading track portion of the guide track, each of the carrier members including at least one sliding contact engaging said current rail.

13. A machine as claimed in claim 2 comprising driving means for the carrier feed means, the carrier return means, and the carrier driving means comprising a motor, a first gear mechanism driven by said motor and having a continuously adjustable gear ratio, and a second gear driven by said motor and also having a continuously adjustable gear ratio, said first gear mechanism directly driving the said carrier feed means, the said second gear mechanism driving the carrier return means as well as the carrier driving means.

14. A machine as claimed in claim 2 comprising controllable speed regulating means driving the carrier driving means and a photoelectric device adjacent the path of travel of the web and adapted to be activated by indicia appearing on the web of sheet material and means associating the photoelectric device with the said speed regulating means to control the same and thereby the speed of the carrier drive means.

15. A machine as claimed in claim 2 comprising means for cutting the web of material into individual sheets, a piling means near the rear end of the leading track portions for stacking the individual cut sheets, said piling means comprising at least one pair of wings supported for free rotating movement about an axis extending perpendicular to the direction of movement of the pairs of carrier members which advance the web of sheet material, said wings extending diametrically opposite one another and having a position of rest in which one wing is facing against the direction of movement and extends in the path of travel of the said carrier members in the leading track portions but above the travel path of the web of sheet material, such that, one of the pairs of carrier members can contact the said one wing to swing the same downwardly to cause the end thereof to contact one of the sheets already cut from the web but still clamped between the said pair of carrier members, whereby an end of the said one sheet is pulled loose from the carrier members and is pushed downwardly, a piling surface beneath the wings for receiving the sheets as the same are pulled loose from the carrier members, said piling means further comprising means for adjusting the position of the said wings in the direction of travel of the web, to synchronize the moment in which the said end of the relative part of sheet material is pushed downwardly with the opening of the preceding pair of carrier members which until then still clampingly engages the other end of the said one sheet so that the sheet is free to be deposited onto the said piling surface.

16. A machine as claimed in claim 15 wherein said wings have opposite ends and comprising rollers of resilient material on said opposite ends of the wings.

17. A machine as claimed in claim 15 wherein said piling means comprise a driven conveyor belt and means for periodically driving the conveyor belt after the piling of a predetermined number of sheets thereon.

18. A machine as claimed in claim 17 comprising counting means coupled with said wings for controlling the means for driving the conveyor belt for driving the same and thereby transporting the sheets deposited thereon when the wings have undergone a predetermined number of revolutions.

No references cited.

EARL M. BERGERT, *Primary Examiner.*

DOUGLAS J. DRUMMOND, *Examiner.*